United States Patent
Cho (10) Patent No.: US 10,007,403 B2
(45) Date of Patent: Jun. 26, 2018

(54) SYSTEM AND METHOD FOR OPERATING MEMO FUNCTION COOPERATING WITH AUDIO RECORDING FUNCTION

(71) Applicant: Samsung Electronics Co. Ltd., Suwon-si, Gyeonggi-do (KR)

(72) Inventor: Sungjae Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 499 days.

(21) Appl. No.: 13/779,266

(22) Filed: Feb. 27, 2013

(65) Prior Publication Data

US 2013/0232413 A1   Sep. 5, 2013

(30) Foreign Application Priority Data

Mar. 2, 2012  (KR) ........................ 10-2012-0021941

(51) Int. Cl.
| | |
|---|---|
| *G06F 3/048* | (2013.01) |
| *G10L 13/00* | (2006.01) |
| *G06F 17/00* | (2006.01) |
| *G06F 3/00* | (2006.01) |
| *G06F 3/0484* | (2013.01) |
| *G11B 27/034* | (2006.01) |
| *G11B 27/11* | (2006.01) |
| *G11B 27/34* | (2006.01) |

(52) U.S. Cl.
CPC .......... *G06F 3/0484* (2013.01); *G11B 27/034* (2013.01); *G11B 27/11* (2013.01); *G11B 27/34* (2013.01)

(58) Field of Classification Search
CPC . G06F 3/048; G06F 3/00; G06F 17/00; G10L 13/00; G10L 15/00
See application file for complete search history.

(56) References Cited

U.S. PATENT DOCUMENTS

| | | | |
|---|---|---|---|
| 5,818,436 A | 10/1998 | Imai et al. | |
| 6,260,011 B1* | 7/2001 | Heckerman | G06F 17/30017 704/231 |
| 6,263,308 B1* | 7/2001 | Heckerman | G10L 15/063 704/231 |
| 6,961,895 B1* | 11/2005 | Beran et al. | 715/203 |
| 9,185,225 B1* | 11/2015 | Vance | H04M 11/10 |
| 2002/0143544 A1* | 10/2002 | Gschwendtner | G10L 15/22 704/260 |
| 2004/0067048 A1 | 4/2004 | Seo et al. | |

(Continued)

FOREIGN PATENT DOCUMENTS

| | | |
|---|---|---|
| CN | 1764949 A | 4/2006 |
| CN | 101034995 A | 9/2007 |

(Continued)

*Primary Examiner* — Hugo Molina
(74) *Attorney, Agent, or Firm* — Jefferson IP Law, LLP (57) ABSTRACT

A system and a method that executes a memo function cooperating with an audio recording function are provided. The method includes executing a memo including memo data synchronized with audio data, wherein the memo data is configured to a plurality of objects, and each object is synchronized to a index point of the audio data, and outputting a screen corresponding to the execution of the memo, wherein the screen displays a progress bar for displaying a playback state of the audio data to first area and displays the memo data to a second area.

15 Claims, 7 Drawing Sheets

(56) References Cited

U.S. PATENT DOCUMENTS

| | | | |
|---|---|---|---|
| 2004/0175154 A1 | 9/2004 | Yoon et al. | |
| 2005/0136955 A1* | 6/2005 | Mumick | H04L 51/38 455/466 |
| 2006/0074623 A1 | 4/2006 | Tankhiwale | |
| 2007/0294374 A1 | 12/2007 | Tamori | |
| 2008/0005656 A1* | 1/2008 | Pang et al. | 715/500.1 |
| 2008/0027726 A1* | 1/2008 | Hansen | G10L 13/00 704/260 |
| 2008/0071827 A1 | 3/2008 | Hengel et al. | |
| 2009/0232284 A1 | 9/2009 | Afifi et al. | |
| 2009/0240734 A1 | 9/2009 | Lloyd-Jones et al. | |
| 2010/0260482 A1 | 10/2010 | Zoor | |
| 2011/0080345 A1* | 4/2011 | Jun | G06F 3/0235 345/169 |
| 2011/0130130 A1 | 6/2011 | Du | |
| 2011/0145428 A1 | 6/2011 | Wei et al. | |
| 2011/0153330 A1* | 6/2011 | Yazdani | G10L 13/00 704/260 |
| 2011/0154119 A1 | 6/2011 | Wang et al. | |
| 2011/0154199 A1 | 6/2011 | Maffitt et al. | |
| 2011/0184738 A1* | 7/2011 | Kalisky | G06F 3/04883 704/260 |
| 2011/0231184 A1 | 9/2011 | Kerr | |
| 2011/0231474 A1* | 9/2011 | Locker | G06F 17/30058 709/203 |
| 2011/0288861 A1* | 11/2011 | Kurzweil et al. | 704/235 |
| 2011/0288862 A1* | 11/2011 | Todic | G10L 15/05 704/235 |
| 2011/0295596 A1 | 12/2011 | Hung et al. | |
| 2012/0033948 A1* | 2/2012 | Rodriguez | G11B 27/34 386/282 |
| 2012/0245721 A1* | 9/2012 | Story, Jr. | G06F 3/04842 700/94 |
| 2012/0246343 A1* | 9/2012 | Story, Jr. | H04L 67/1095 709/248 |
| 2013/0021270 A1* | 1/2013 | Lee | 345/173 |

FOREIGN PATENT DOCUMENTS

| | | |
|---|---|---|
| CN | 101127870 A | 2/2008 |
| CN | 101600022 A | 12/2009 |
| CN | 102083024 A | 6/2011 |
| JP | 06-343146 A | 12/1994 |
| JP | 09-098212 A | 4/1997 |
| JP | 11-025112 A | 1/1999 |
| JP | 2000-149511 A | 5/2000 |
| JP | 2002-073095 A | 3/2002 |
| JP | 2005-072896 A | 3/2005 |
| JP | 2006-293186 A | 10/2006 |
| JP | 2008-065960 A | 3/2008 |
| WO | 93/21588 A1 | 10/1993 |

* cited by examiner

SYSTEM AND METHOD FOR OPERATING MEMO FUNCTION COOPERATING WITH AUDIO RECORDING FUNCTION

PRIORITY

This application claims the benefit under 35 U.S.C. § 119(a) of a Korean patent application filed on Mar. 2, 2012 in the Korean Intellectual Property Office and assigned Serial No. 10-2012-0021941, the entire disclosure of which is hereby incorporated by reference.

BACKGROUND OF THE INVENTION

1. Field of the Invention

The present invention relates to a memo function. More particularly, the invention relates to a system and method that operates a memo function cooperating with an audio recording function.

2. Description of the Related Art

Mobile devices are mobile, electronic communication devices that may support a call function, and are used in a variety of areas. Mobile devices are equipped with various types of input systems to provide user functions. For example, mobile devices may employ touch screens. A touch screen includes a touch panel and a display panel. Mobile devices with touch screens display screen data, e.g., images, on the display panel and detect a user's touch to select an image, displayed on the display panel, via the touch panel. Mobile devices may provide a variety of functions, e.g., a voice call, an audio playback, a message transmission/reception, a digital broadcast reproducing function, a short-range Radio Frequency (RF) communication function, an Internet access function, etc. Mobile devices may also be equipped with a multi-tasking function to execute a number of operations simultaneously.

Mobile devices may also be equipped with a memo function. With the memo function, users can record information in the mobile devices regarding specific events. However, the memo function of the related art is operated such that a notepad is activated, users are able to input text, and the text is stored. Since users are apt to input a memo in a summarized form or in an acronym/abbreviated form via the memo function, if they check the memo later, they may have difficulty understanding what the memo means. That is, memo functions of the related art are inconvenient to use since users may not easily recall the meaning of the memos they record. Therefore, the memo function is not often used.

Therefore, a need exists for a system and method for a memo function that is convenient to use.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a system and method that can execute a memo function cooperating with an audio recording function, and can allow users to write and store a memo associated with recorded audio data.

Another aspect of the present invention is to provide a system and method that can execute a memo function cooperating with an audio recording function, create an object corresponding to an input memo, and store the created object that synchronizes an index point of recorded audio data.

Another aspect of the present invention is to provide a system and method for operating a memo function cooperating with an audio recording function that can move a position where recorded audio data is played back, according to a selection of an object on a screen displaying a memo.

In accordance with an aspect of the present invention, a method for operating a memo function cooperating with an audio recording function is provided. The method includes executing a memo including memo data synchronized with audio data, wherein the memo data is configured to a plurality of objects, and each object is synchronized to a index point of the audio data, and outputting a screen corresponding to the execution of the memo, wherein the screen displays a progress bar for displaying a playback state of the audio data to first area and displays the memo data to a second area.

In accordance with another aspect of the present invention, a system for operating a memo function cooperating with an audio recording function is provided. The system includes a storage unit for storing a memo including memo data synchronized with audio data, wherein the memo data is configured to a plurality of objects, and each object is synchronized to a index point of the audio data, a controller for controlling a execution of the memo including memo data synchronized with audio data, and a touch screen for displaying a screen corresponding to the execution of the memo, wherein the screen displays a progress bar for displaying a playback state of the audio data to first area and displays the memo data to a second area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although exemplary embodiments of the invention are described for illustrative purposes, a person skilled in the art will appreciate that various modifications and changes may be made to the specific exemplary embodiments described below without departing from the spirit and scope of the invention. Thus, the specification and drawings are to be regarded as illustrative and exemplary rather than restrictive or all-encompassing, and all such modifications to the specific exemplary embodiments described below are intended to be included within the scope of the invention.

In the following description, a mobile device can be implemented as mobile communication terminals, Personal Digital Assistants (PDAs), smart phones, tablet personal computers (PCs), Portable Multimedia Players (PMPs), electronic book readers, laptop computers, net book computers, etc.

Figure 1:
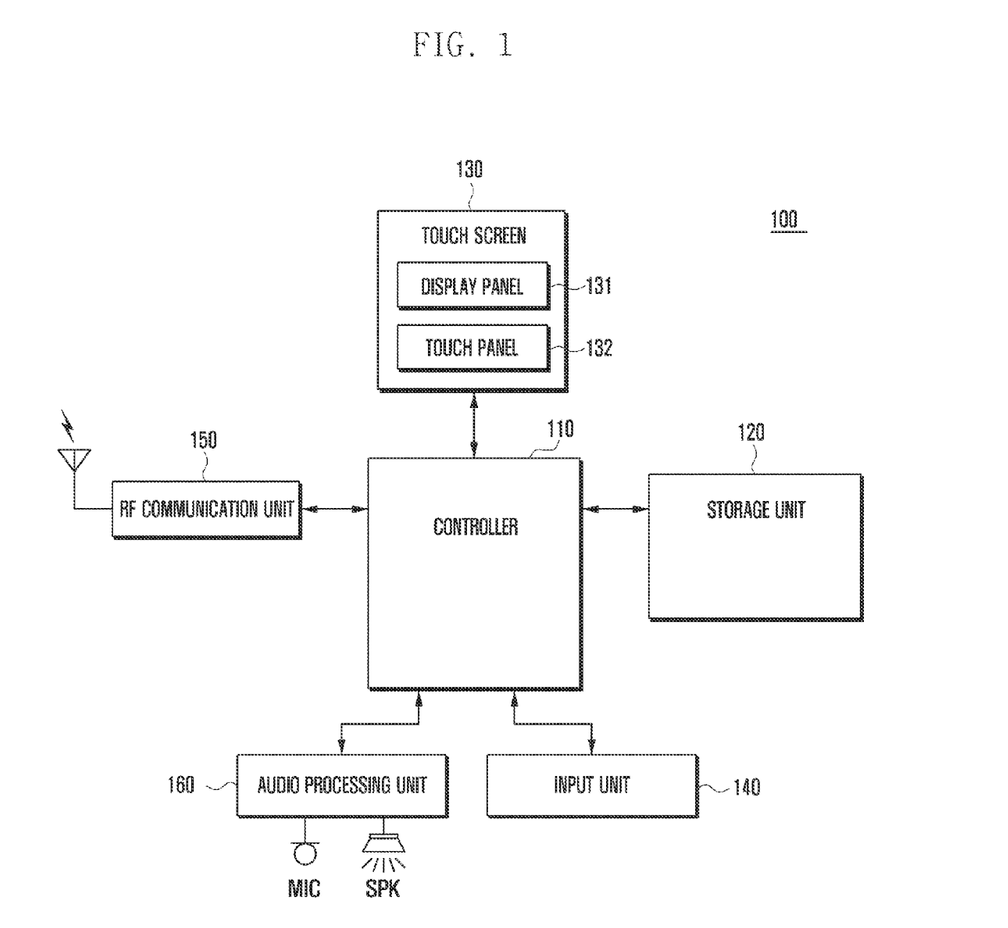
FIG. 1 illustrates a schematic block diagram of a mobile device according to an exemplary embodiment of the present invention.

FIG. 1 illustrates a schematic block diagram of a mobile device according to an exemplary embodiment of the present invention.

Referring to FIG. 1, a mobile device 100 includes a storage unit 120, a touch screen 130, an input unit 140, a Radio Frequency (RF) communication unit 150, an audio processing unit 160, and a controller 110. The touch screen 130 includes a display panel 131 and a touch panel 132.

The mobile device 100 can execute a memo function cooperating with an audio recording function. If an audio recording function is executed while a memo function is being executed, a memo function is executed while an audio recording function is being executed, or a memo function and an audio recording function are simultaneously executed, the mobile device 100 creates an object from the user's written memo, according to a predefined rule, synchronizes the created object with the index point of the recorded audio data, and stores it. That is, the mobile device 100 can store the object, created when a memo is input, by synchronizing with the timeline of the recorded audio data. The mobile device 100 provides a menu for controlling the playback of the recorded audio data when outputting the stored memo. If users cannot recall the content of a stored memo, they can play back the audio data recorded when the memo was written via the control menu, thereby recalling the content of the memo. In particular, since an object of a memo has synchronized an index point of a recorded audio data, the mobile device 100 can easily play back the audio data recorded when the memo was written on the memo displaying screen. That is, if an object is selected (e.g., touched) on the memo displaying screen, the mobile device 100 can play back the recorded audio data at a position that synchronizes with the selected object. Therefore, although audio data and memos are recorded in the mobile device 100 for a relatively long period of time, e.g., during a lecture, seminar, conference, etc., the system and method according to exemplary embodiments of the present invention can easily play back the recorded audio data related to corresponding memos. In the following description, the components of the mobile device 100 are described in detail referring to the accompanying drawings.

The RF communication unit 150 establishes a communication channel for making a voice/video call with a base station. The RF communication unit 150 also establishes a communication channel for transmitting/receiving data to/from a base station. To this end, the RF communication unit 150 includes an RF transmitter (not shown) for up-converting the frequency of signals to be transmitted and amplifying the signals, an RF receiver (not shown) for low-noise amplifying received RF signals and down-converting the frequency of the received RF signals, and a duplexer (not shown) for separating received signals and signals to be transmitted.

The audio processing unit 160 includes a speaker SPK and a microphone MIC. The audio processing unit 160 outputs audio data, transmitted/received during a call, audio data included in a received message, and audio data created when audio files stored in the storage unit 120 are played back, via the speaker. The audio processing unit 160 receives a user's voice or other audio sounds via the microphone. In particular, when the memo function and the audio recording function are executed in the mobile device 100, the audio processing unit 160 can receive an audio signal via the microphone as audio data while the user is writing a memo. After that, the audio processing unit 160 stores the received audio data synchronized to an object of the memo under control of the controller 110. For example, if a user executes a memo function and an audio recording function in a mobile device 100 in an environment, e.g., a lecture, a seminar, a conference, etc., and writes a memo on the memo screen, the audio processing unit 160 collects the external audio signal via the microphone as audio data and stores it so it is associated with the input memo. If a user executes a memo function in a mobile device 100, executing a voice/video calling and playing back a broadcast or music, and inputs a memo on the memo screen, the audio data, created according to the voice/video call and the playback of the broadcast or music, are synchronized to the input memo data and stored in the storage unit 120. Although the exemplary embodiment shown in FIG. 1 is implemented in such a way that the audio processing unit 160 includes one microphone for making a voice/video call, it should be understood that the invention is not limited to the exemplary embodiment. That is, the audio processing unit 160 may further include a second microphone that can be activated when an audio recording function is turned on, preferably, a high-fidelity microphone. The high-fidelity microphone can allow users to write down a lecture that a speaker, relatively far apart from them, is making in a lecture room, in a state where a memo function and an audio recording function are executed in the mobile device. However, this operation may not be faithfully performed by the mobile device 100 using only a microphone for making a voice/video call.

The input unit 140 includes input keys and function keys that receive numbers and letters and set and control a variety of functions in the mobile device 100. The input unit 140 transfers, to the controller 110, a variety of input signals for turning on/off a memo function and an audio recording function, searching for a memo, i.e., outputting a list of memos, selecting one of the memos in the list, selecting a specific object on a memo displaying screen, playing back recorded audio data, etc. The input unit 140 may be implemented with one of a button key pad, a ball joystick, an optical joystick, a wheel key, touch keys, a touch pad, a touch screen, etc., or a combination thereof.

The touch screen 130 performs an input function and a display function. To this end, the touch screen 130 includes the display panel 131 and the touch panel 132.

The display panel 131 displays menus of the mobile device 100, and information input by the user or information provided to the user. The display panel 131 provides various types of screens according to the operations of the mobile device 100, such as an idle screen (e.g., home screen), menu screens, a message writing screen, a call screen, a schedule management screen, a contact list display screen, a web page display screen, etc. The display panel 131 may display an icon or a menu for activating a memo function on a certain area on the screen. The icon may be replaced with a specific side key. In addition, the display panel 131 may also display a screen for allowing a user to write a memo or a screen for displaying the written memo. The memo writing screen may include a tool box for writing a memo. The tool box includes a number of tools for inputting text, diagrams, lines, symbols, emoticons, etc. The memo writing screen may also include a menu for executing an audio recording function. If a memo includes recorded audio data, the memo displaying screen shows a first area for controlling the playback of the recorded audio data and a second area for displaying the memo content. This will be described in detail further below with reference to FIG. 7. The display unit 131 may be implemented with a Liquid Crystal Display (LCD), Light Emitting Diode (LEDs), Organic Light Emitting Diodes (OLEDs), Active Matrix Organic Light Emitting Diodes (AMOLEDs), or the like.

The touch panel 132 is disposed on the display panel 131. The touch panel 132 detects a touch event by a touch tool, e.g., a user's finger, a stylus pen, or the like, creates a corresponding signal, and transfers it to the controller 110. The touch panel 132 detects the change in a physical quantity (e.g., capacitance, resistance, etc.) according to the presence of a touch by a touch tool, and transfers information regarding the touch location to the controller 110. Since the operations of the touch panel are well-known to an ordinary person skilled in the art, a detailed description is omitted in the following description. The touch panel 132 may include a first touch panel for detecting general touches such as a user's gestures, and a second touch panel for allowing a user to input memos with additional accuracy via stylus or electronic pen, etc. The touch panel 132 may performs the functions described herein of the input unit 140, and in that case, the input unit 140 may be omitted. Further, the input unit 140 may perform the functions described herein of the touch panel 132, and in that case, the touch panel 132 may be omitted.

The storage unit 120 stores an Operating System (OS) of the mobile device 100. The storage unit 120 stores applications required for the options, e.g., an audio file playback function, an image/video playback function, an Internet access function, a digital broadcast reproducing function, etc. The storage unit 120 also stores user's input data and data transmitted/received in communication. For example, the storage unit 120 stores video files, game files, music files, movie files, etc. The storage unit 120 may also store an object creating program for identifying input memos by a unit of object according to a preset rule. The object creating program may create objects, according to an input time t and/or an input distance s. An object may be altered in size according to an input time t and an input distance s. For example, the object creating program may create one letter or a number of letters, as one object, according to an input time t and an input distance s. An input time t and an input distance s may have different values according to input modes. For example, an input time t and an input distance s may have relatively small values when text is input. On the contrary, an input time t and an input distance s may have relatively large values when an image is input. In that case, the object may include a start position, the maximum size, a start time, and the total writing time. A detailed description related to objects will be described in detail further below with reference to FIGS. 4A to 5B.

The storage unit 120 stores a synchronizing program that stores created objects that synchronize with index points of recorded audio data. The synchronizing program synchronizes a start time of an object with a timeline of recorded audio data. The storage unit 120 stores a playback program for playing back recorded audio data. If a specific object is selected (e.g., touched) on a memo displaying screen, the playback program moves the playback position to an index point of the recorded audio data that synchronizes with the selected object and plays back the recorded audio data.

The controller 110 controls the entire operation of the mobile device 100 and the signals between the components in the mobile device 100. The controller 110 also performs a data processing function. The controller 110 may be a Central Processing Unit (CPU), a Micro-Processor Unit (MPU), an Application Processor, etc. In particular, the controller 110 controls the operation of the memo function to cooperate with an audio recording function. That is, the controller 110 can control the memo writing procedure and the memo storing procedure. The controller 110 also controls a procedure for creating objects according to a preset rule. The controller 110 also controls a procedure for outputting the written memos. A detailed description related to the control operations will be explained in detail further below with reference to FIGS. 2 to 7.

Referring to FIG. 1, the mobile device may selectively further include various types of components, for example, a Global Positioning System (GPS) module, a digital broadcast module for receiving and reproducing broadcasts, an audio sound playback module such as an MP3 module, a short-range communication module for short-range communication, etc. With the trend of digital convergence, although it is not possible to list all the modifications of mobile devices in this description, it will be easily appreciated by those skilled in the art that the other components equivalent to the above-listed components may be further included to the mobile device according to the exemplary embodiments of the present invention.

Figure 2:
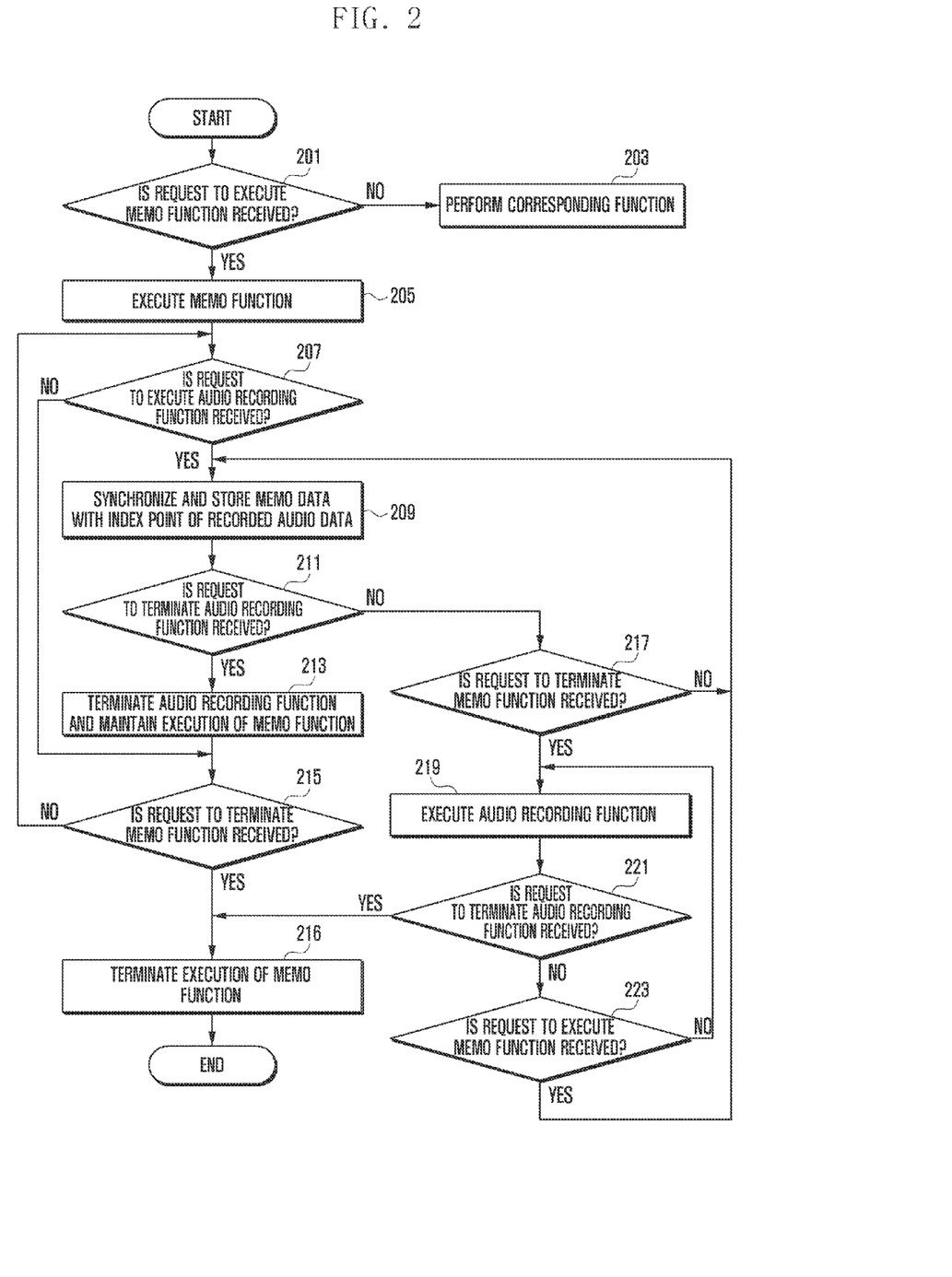
FIG. 2 illustrates a flowchart describing a method for writing a memo according to a first exemplary embodiment of the present invention.

FIG. 2 illustrates a flowchart describing a method for writing a memo according to a first exemplary embodiment of the present invention.

Referring to FIGS. 1 and 2, the controller 110 determines whether a request is received to execute a memo function at step 201. If the controller 110 ascertains that a request is received which differs from a request for the execution of a memo function at step 201, the controller 110 performs a corresponding operation at step 203. For example, the controller 110 executes a music playback function, a broadcast playback function, or an Internet access function according to a user's request, or maintains the idle state. On the contrary, if the controller 110 ascertains that a request is received to execute a memo function at step 201, the controller 110 executes the memo function at step 205. That is, the controller 110 controls the touch screen 130 to display a memo writing screen and stores a memo, if the memo is input to the touch screen 130, in the storage unit 120.

After that, the controller 110 determines whether a request is received to execute an audio recording function while executing the memo function at step 207. If the controller 110 ascertains that a request is received to execute an audio recording function while executing the memo function at step 207, the controller 110 synchronizes an index point of input audio data to memo data and stores it at step 209. To this end, if the controller 110 ascertains that a memo is input to the memo writing screen, the controller 110 creates the object according to a preset rule, synchronizes the created memo object with an index point of the input audio data, and stores it. The process for creating the object according to a preset rule will be described in detail further below with reference to FIGS. 4A to 5B.

After storing the audio data and the memo data at step 209, the controller 110 determines whether a request is received to terminate an audio recording function at step 211. If the controller 110 ascertains that a request is received to terminate an audio recording function at step 211, the controller 110 terminates the audio recording function, and maintains the execution of the memo function at step 213. After that, the controller 110 determines whether a request is received to terminate the memo function at step 215. If the controller 110 ascertains that a request is received to terminate the memo function at step 215, the controller 110 terminates the execution of the memo function at step 216. On the contrary, if the controller 110 ascertains that a request is not made to terminate the memo function at step 215, the controller 110 returns to and proceeds with step 207.

Meanwhile, if the controller 110 ascertains that a request is not made to execute an audio recording function while executing the memo function at step 207, the controller 110 proceeds with step 215.

Referring back to step 211, if the controller 110 ascertains that a request is not made to terminate an audio recording function at step 211, the controller 110 determines whether a request is received to terminate the memo function at step 217. If the controller 110 ascertains that a request is not made to terminate the memo function at step 217, the controller 110 returns to and proceeds with step 209. On the contrary, if the controller 110 ascertains that a request is received to terminate the memo function at step 217, the controller 110 terminates the memo function and maintains the execution of the audio recording function at step 219. After that, the controller 110 determines whether a request is received to terminate the audio recording function at step 221. If the controller 110 ascertains that a request is received to terminate the audio recording function at step 221, the controller 110 terminates the execution of the audio recording function at step 216. On the contrary, if the controller 110 ascertains that a request is not made to terminate the audio recording function at step 221, the controller 110 determines whether a request is received to execute a memo function at step 223. If the controller 110 ascertains that a request is not made to execute a memo function at step 223, the controller 110 returns to and proceeds with step 219. On the contrary, if the controller 110 ascertains that a request is received to execute a memo function at step 223, the controller 110 returns to and proceeds with step 209.

Although the exemplary embodiment is implemented in such a way that an audio recording function is executed while a memo function is being executed, it should be understood that the present invention is not limited to the exemplary embodiment. For example, the exemplary embodiment may be modified in such a way that a memo function is executed while an audio recording function is being executed, or a memo function and an audio recording function are executed together. In addition, although the exemplary embodiment is implemented in such a way that a memo function or an audio recording function is separately disenabled, it should be understood that the present invention is not limited to the exemplary embodiment. For example, the exemplary embodiment may be modified in such a way that, while a memo function and an audio recording function are being executed, if a signal for terminating the execution of the memo function is input, the controller disenables both the memo function and the audio recording function. Alternatively, the exemplary embodiment may also be modified in such a way that, while a memo function and an audio recording function are being executed, if a signal for terminating the execution of the audio recording function is input, the controller disenables both the memo function and the audio recording function.

Figure 3:
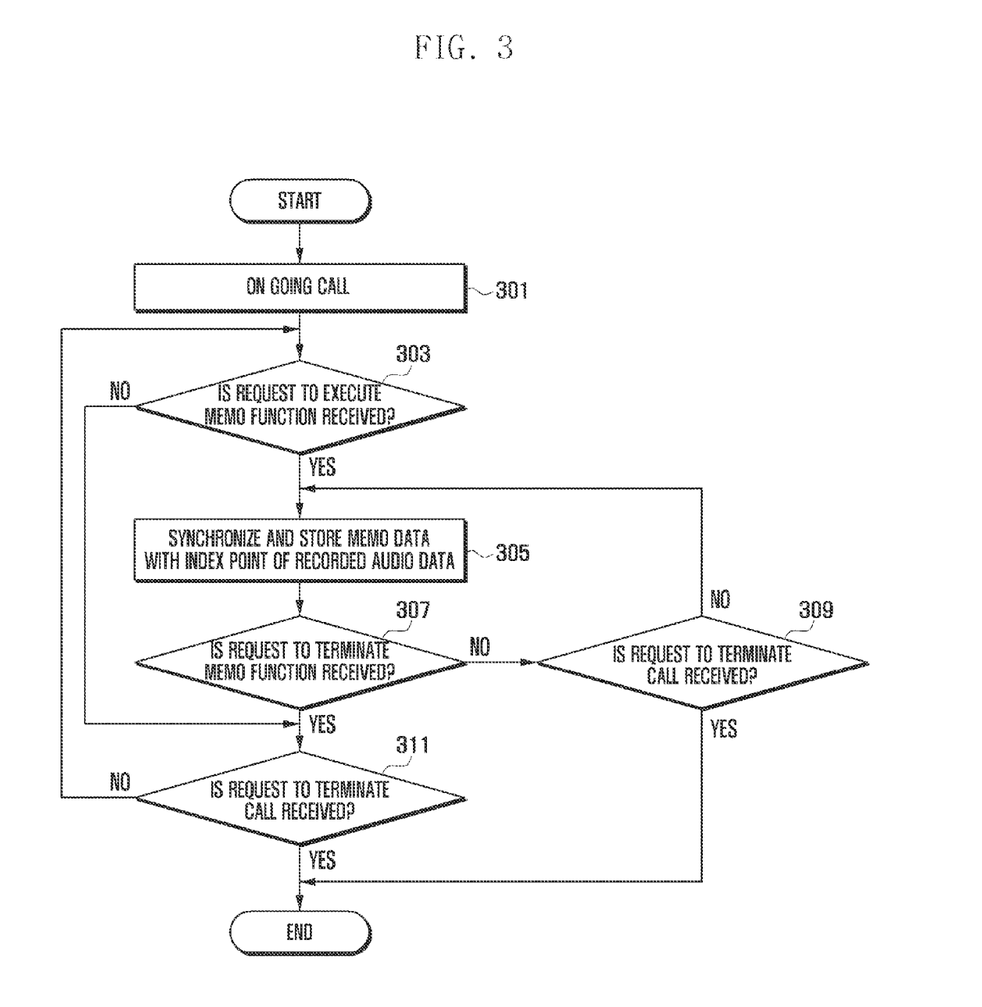
FIG. 3 illustrates a flowchart describing a method for writing a memo according to a second exemplary embodiment of the present invention.

FIG. 3 illustrates a flowchart describing a method for writing a memo according to a second exemplary embodiment of the present invention.

Referring to FIG. 3, it is assumed that the mobile device 100 is being used for a call at step 301. During the call, the controller 110 determines whether a request is received to execute a memo function at step 303. If the controller 110 ascertains that a request is received to execute a memo function at step 303, the controller 110 synchronizes an index point of audio data to memo data and stores it at step 305. To this end, if the controller 110 ascertains that a memo is input to the memo writing screen, the controller 110 creates the object according to a preset rule, synchronizes the created memo object with an index point of the input audio data, and stores it. The process for creating the object according to a preset rule will be described in detail further below with reference to FIGS. 4A to 5B.

After storing the audio data and the memo data at step 305, the controller 110 determines whether a request is received to terminate a memo function at step 307. If the controller 110 ascertains that a request is not made to terminate a memo function at step 307, the controller 110 determines whether a request for terminating a call is received at step 309. Here, the request for terminating a call may be a signal. If the controller 110 ascertains that a request for terminating a call is received at step 309, the controller 110 terminates the current call and the memo function. On the contrary, if the controller 110 ascertains that a request for terminating a call is not received at step 309, the controller 110 returns to step 305.

Referring back to step 307, if the controller 110 ascertains that a request is received to terminate a memo function at step 307, the controller 110 determines whether a request for terminating a call is received at step 311. Here, the request for terminating a call may be a signal. If the controller 110 ascertains that a request for terminating a call is received at step 311, the controller 110 terminates the current call. On the contrary, if the controller 110 ascertains that a request for terminating a call is not received at step 311, the controller 110 returns to step 303. Meanwhile, if the controller 110 ascertains that a request is not made to execute a memo function at step 303, the controller 110 proceeds with step 311.

Although the exemplary embodiment is implemented in such a way that a memo function is executed during a call, it should be understood that the invention is not limited to the exemplary embodiment. For example, the exemplary embodiment may be modified in such a way that a memo function is executed while an audio file, e.g., a music file, or a broadcast or a video file is being played back.

Figure 4A:
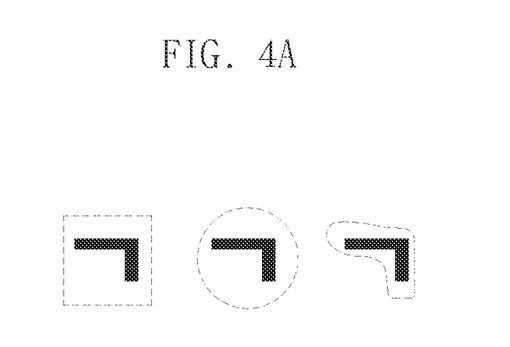
FIGS. 4A and 4B illustrate views describing a method for creating objects according to an exemplary embodiment of the present invention.
Figure 4B:
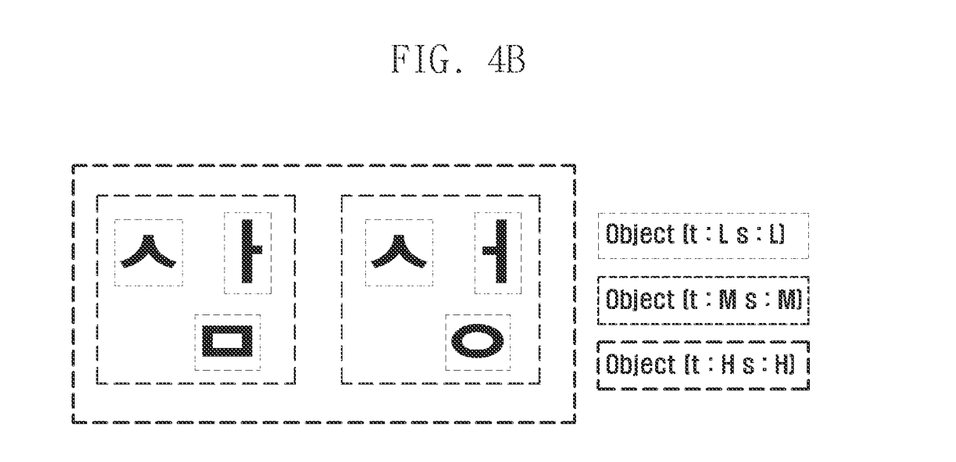

FIGS. 4A and 4B illustrate views describing a method for creating objects according to an exemplary embodiment of the present invention.

Figure 5A:
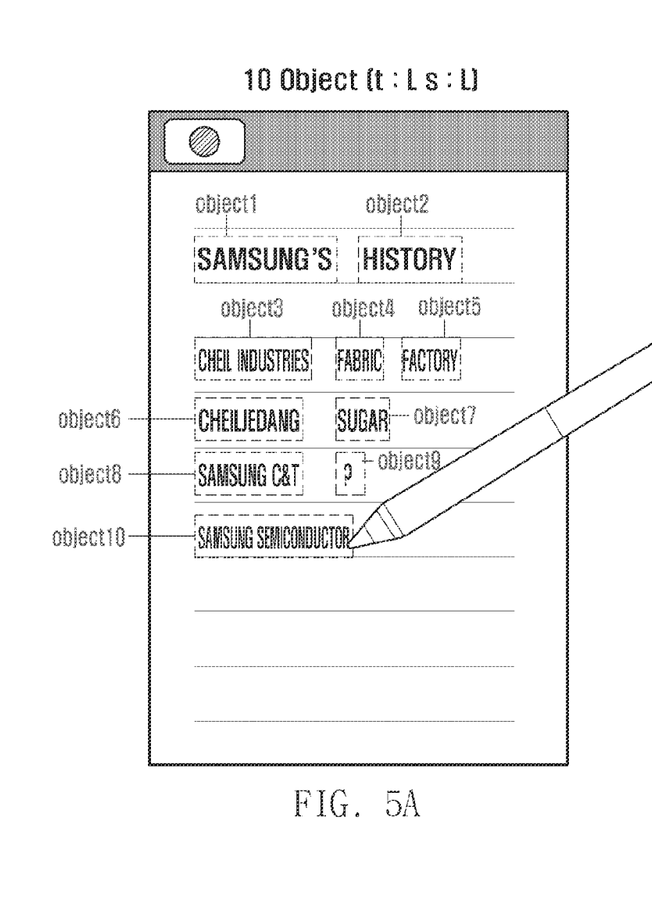
FIGS. 5A and 5B illustrate views describing a method for creating objects according to an exemplary embodiment of the present invention.
Figure 5B:
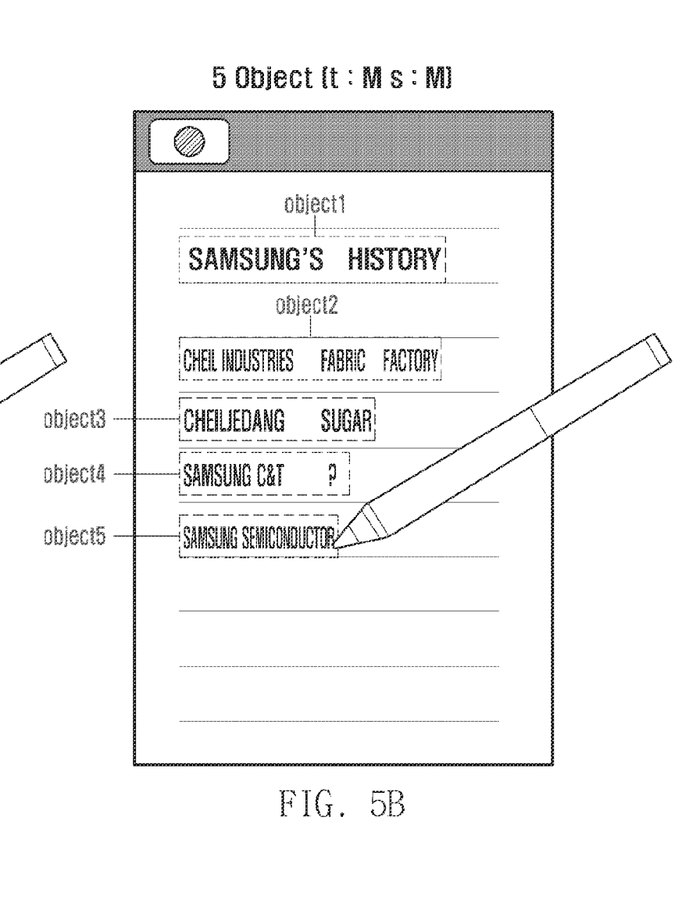

FIGS. 5A and 5B illustrate views describing a method for creating objects according to an exemplary embodiment of the present invention.

Referring to FIGS. 1 to 5B, an object refers to memo data created by a touch that starts to draw a line, a curve, a diagram, or the like, until completing a drawing or a letter, without losing the contact. Examples of an object are a letter, a dot, a check mark, a symbol, etc. Alternatively, as shown in FIG. 4A, the object may be defined as various patterns including letters, symbols, figures, diagrams, etc., e.g., a triangle, a rectangle, a circle, etc.

A number of objects may be combined to form one object. For example, as shown in FIG. 4B, vowels and consonants in Korean (or Hangeul) 'ㅅ' (read as 'siot'), 'ㅏ' (read as 'a'), 'ㅁ' (read as 'mieum'), 'ㅅ' (read as 'siot'), 'ㅓ' (read as 'eo'), and 'ㅇ' (read as 'ieung') can be defined as respective objects. In addition, syllables in Korean, '삼' (read as 'sam') and '성' (read as 'sung'), can be defined as respective objects. One word in Korean, '삼성' (read as 'samsung'), can be defined as one object. The size of an object created when a memo is input depends on object creating rules, including an input time t and/or an input length s. That is, as shown in FIGS. 5A and 5B, although the same memo is input to the mobile device 100, 10 or 5 objects may be created according to the object creation rules.

Referring to FIGS. 5A and 5B, the labels 'object 1', 'object 2', . . . 'object 10', are illustrated for the sake of convenience in description, and are not necessarily displayed on the screen in an actual implementation.

An input time t and an input length s to create an object may be fixed to preset values according to a manufacturer's setting. Alternatively, they may be set to corresponding values according to a user's settings. Alternatively, they may be designed to a number of levels respectively and then set to corresponding levels according to the user's selection. For example, as shown in FIGS. 4A and 4B, the input time t and the input length s may be designed to be set as one of three levels, High, Medium, and Low, via an option menu.

The input time t and the input length s may have different values according to input modes. For example, the input time t and the input length s may have a relatively small value, the Low level from the High, Medium and Low levels, in a letter input mode, and a relatively large value, the High level, in a drawing mode.

Figure 6:
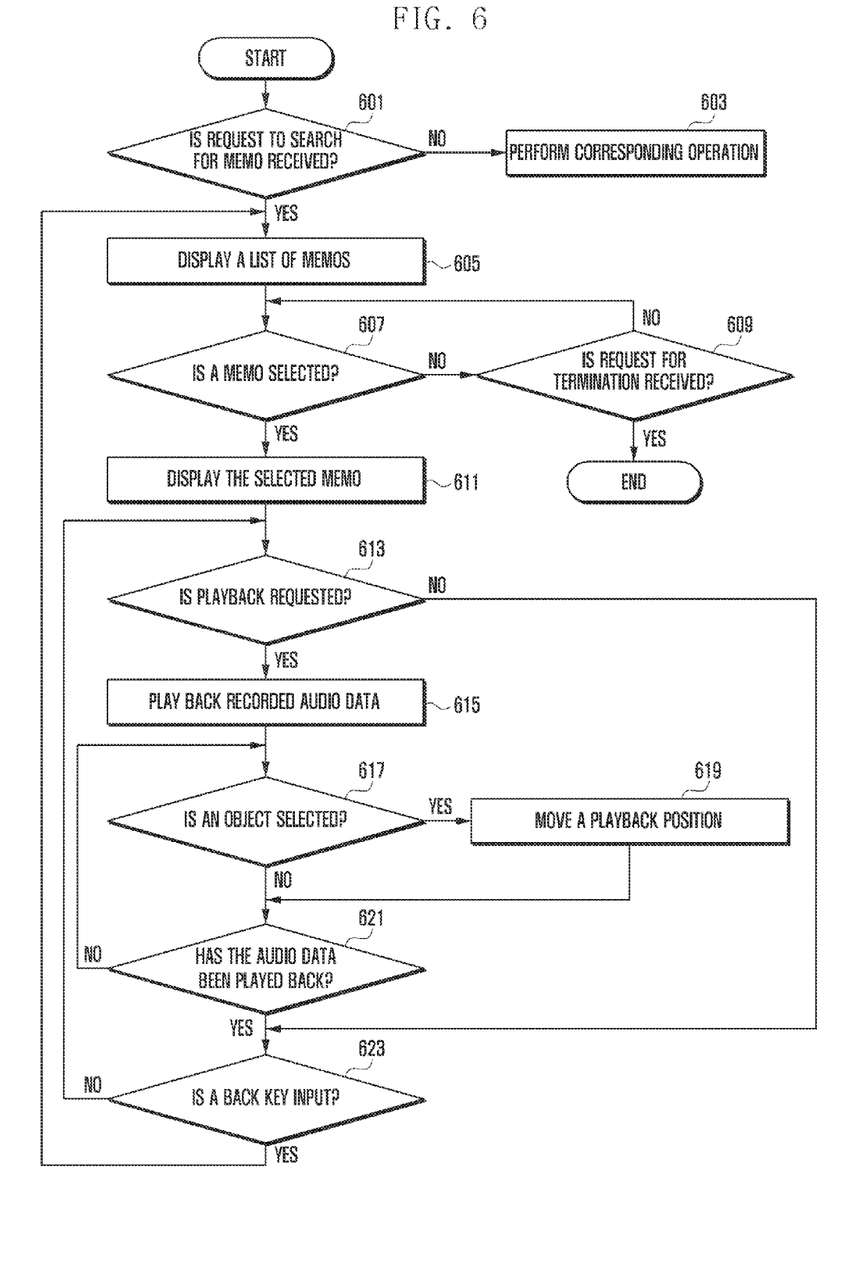
FIG. 6 illustrates a flowchart describing a method for outputting a memo according to an exemplary embodiment of the present invention.

FIG. 6 illustrates a flowchart that describing a method for outputting a memo according to an exemplary embodiment of the present invention.

Figure 7:
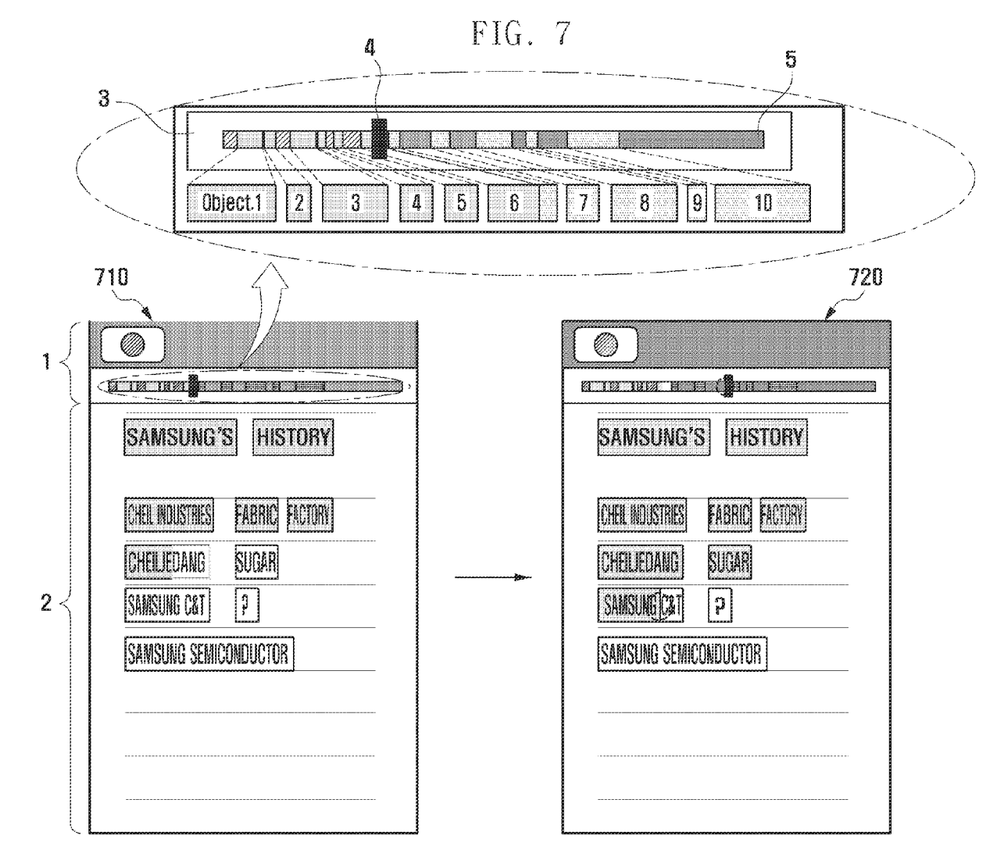
FIG. 7 illustrates screens displaying a created memo on a screen according to an exemplary embodiment of the present invention.

FIG. 7 illustrates screens displaying a created memo on a screen according to an exemplary embodiment of the present invention.

Referring to FIGS. 1 to 7, the controller 110 determines whether a request is received to search for a memo at step 601. If the controller 110 ascertains that a request is received which differs from a request for the search of a memo at step 601, the controller 110 performs a corresponding operation at step 603. For example, the controller 110 executes a music playback function, a broadcast playback function, or an Internet access function according to a user's request, or maintains the idle state.

On the contrary, if the controller 110 ascertains that a request is received to search for a memo at step 601, the controller 110 controls to display a list of memos stored in the storage unit 120 at step 605. The displayed list includes memos associated with recorded audio data and memos that are not associated with recorded audio data. The controller 110 may control to display a list of memos, distinguishing between memos with recorded audio data and memos that are not associated with recorded audio data. For example, the controller 110 may control to display marks (e.g., icons) at one end of the memos with recorded audio data. Alternatively, the controller 110 may divide an area of a list of memos into two sub areas and control to display memos with recorded audio data in one sub-area and memos that are not associated with recorded audio data in another sub-area. Alternatively, the controller 110 may control to provide an option menu for selecting memos with recorded audio data and memos that are not associated with recorded audio data, and control to display only a list of types of memos selected via the option menu.

After controlling to display a list of memos at step 605, the controller 110 determines whether a specific memo is selected at step 607. If the controller 110 ascertains that a specific memo is not selected at step 607, the controller 110 determines whether a request for termination is received at step 609. Here, the request for termination may be a signal. If the controller 110 ascertains that a request for termination is received at step 609, the controller 110 terminates searching for a memo. On the contrary, if the controller ascertains that a request for termination is not received at step 609, the controller 110 returns to step 607.

Meanwhile, if the controller 110 ascertains that a specific memo is selected at step 607, the controller 110 controls to output the selected memo at step 611. In an exemplary embodiment of the invention, it is assumed that the selected memo is a memo associated with recorded audio data.

Referring to FIG. 7, the screen for displaying the selected memo includes a first area 1 for displaying the recorded audio data and a second area 2 for displaying the memo content. The first area 1 includes a status bar (or progress bar) 3 for displaying a playback state of the recorded audio data. The status bar 3 includes a slide bar 4 and a timeline 5 to show a current playback position of the recorded audio data. The timeline 5 may display one area that synchronizes an object and the other area that is not synchronized with an object, in different colors, thereby distinguishing between the two areas.

After controlling to display a memo associated with the recorded audio data at step 611, the controller 110 determines whether a request is received to play back recorded audio data at step 613. Requesting the playback of recorded audio data may be achieved via a playback menu or a double touch of a specific object. The requesting method is an example, so it should be understood that the invention is not limited thereto. That is, requesting the playback of recorded audio data may be achieved via a variety of modes. If the controller 110 ascertains that a request is received to play back recorded audio data at step 613, the controller 110 plays back the recorded audio data at step 615. The controller 110 can control to vary the background color of the object in the second area 2 corresponding to the playback of the recorded audio data. This is to assist the user in easily identifying the memo content related to the recorded audio data that is currently being played back. For example, as shown in diagrams 710 and 720 of FIG. 7, the controller 110 may control to vary the background color of the object in the second area 2 while playing back the recorded audio data.

After playing back the recorded audio data at step 615, the controller 110 determines whether a specific object is selected at step 617. If the controller 110 ascertains that a specific object is selected at step 617, the controller 110 moves the playback position of the recorded audio data at step 619. That is, the controller 110 moves the playback position to a point where the object is selected and plays back the recorded audio data from the point. For example, as shown in diagram 720 of FIG. 7, if the user selects (e.g., touches) an object 'Samsung C&T', the controller 110 plays back the recorded audio data from a position of the index point synchronized to the object 'Samsung C&T'. The controller 110 may move the playback position of the recorded audio data to a position to be played back, based on the start time included in the selected object 'Samsung C&T'. That is, the controller 110 moves the slide bar 4 of the status bar 3 based on a start time of the object. Alternatively, the controller 110 may move the playback position of the recorded audio data to a position to be played back, based on a touch spot (e.g., point) to select the object 'Samsung C&T'. That is, the controller 110 moves the slide bar 4 of the status bar 3 based on a ratio of a length from a start position of the object to a touch point to an entire length of the object. For example, if it is assumed that the object 'Samsung C&T' starts at a 5 second time point in the timeline and the total running time is 12 seconds, and the user touches a middle in the object, the controller 110 moves the playback position to an 11 second (equal to the start time point of 5 seconds plus half of the running time of the object, which is 6 seconds) time point (e.g., position) in the timeline, and plays back the recorded audio data. To this end, the controller 110 detects a touch on the object and calculates the ratio of a length from the start position of the object to the touch point to the entire length of the object. For example, if a memo is written in the horizontal direction (or a horizontal writing mode) and the user touches a point on the memo, the controller 110 can calculate the ratio of the touch point to the total length of the memo. Likewise, if a memo is written in the vertical direction (or a vertical writing mode) and the user touches a point on the memo, the controller 110 can calculate the ratio of the touch point to the total length of the memo.

On the contrary, if the controller 110 ascertains that a specific object is not selected at step 617, the controller 110 determines whether a playback completion signal for the recorded audio data is input at step 621. If the controller 110 ascertains that a playback completion signal for the recorded audio data is not input at step 621, the controller 110 returns to and proceeds with step 617. On the contrary, if the controller 110 ascertains that a playback completion signal for the recorded audio data is input at step 621, the controller 110 determines whether a back key is input at step 623. If the controller 110 ascertains that the back key is not input at step 623, the controller 110 returns to and proceeds with step 613. On the contrary, if the controller 110 ascertains that the back key is input at step 623, the controller 110 returns to and proceeds with step 605 where the controller 110 controls to display a list of memos. Meanwhile, if the controller 110 ascertains that a request is not made to play back recorded audio data at step 613, the controller 110 proceeds with step 623.

Referring to FIGS. 6 and 7, the user may alter the playback position of the recorded audio data by touching and dragging the slide bar 4 to a corresponding position to be played back. Alternatively, the user may alter the playback position of the recorded audio data by touching a time point on the timeline 5. The controller 110 may stop playing back the recorded audio data or pausing on the playback, according to a user's request.

The controller 110 can control the editing function for a written memo, i.e., the deletion, modification and addition of a specific object. For example, if the controller 110 detects the presence of a long touch event on a specific object, meaning that a touching operation is received on the object over a preset period of time, the controller 110 controls to output a menu of deletion, modification and addition items and executes a function corresponding to a user's selection. The controller 110 may control the movement of the object. For example, the user can move an object via a drag and drop action. This function allows the user to arrange memos in his/her desired mode.

The controller 110 also controls the arrangement function of objects. This allows users to arrange memos, randomly or disorderly located on the memo writing screen, in an orderly mode, e.g., on a timeline of recorded audio data, thereby enhancing use convenience. The controller 110 also controls the copying, cutting and pasting function of objects, according to a user's request.

The controller 110 also provides a function for modifying synchronization of recorded audio data. For example, the user can modify the index point of recorded audio data, synchronizing with a start position of an object. This makes it possible to set a time point when the user made a memo to a time point when a speaker made a speech. That is, since a user is apt to make a memo after a speaker's speech, the recorded audio data is not synchronized with the memo. In that case, the user can choose a memo to be edited, select the synchronization modification menu, and then move the memo to a corresponding time point on the timeline via a slide bar.

As described above, the system and method, according to exemplary embodiments of the present invention, can execute a memo function to cooperate with an audio recording function, synchronize the memo data with the recorded audio data, and store them, so that users can easily check or detect the memo. In addition, the system and method can create a number of objects corresponding to input memos, and store the created objects that synchronize with index points of recorded audio data, thereby moving a position where recorded audio data is played back, according to the selection of an object on a screen displaying a memo. That is, users can easily play back recorded audio data from a time point related to a corresponding memo.

As described above, the system and method for operating a memo function cooperating with audio recording function, according to exemplary embodiments of the present invention, can be implemented with program commands that can be conducted via various types of computers and recorded in non-transitory computer-readable recording media. The non-transitory computer-readable recording media may contain program commands, data files, data structures, or the like, or a combination thereof. The program commands recorded in the non-transitory computer-readable recording media may be designed or configured to comply with one or more aspects of the present invention or may be software well-known to the ordinary person skilled in the art. The non-transitory computer-readable recording media includes hardware systems for storing and performing program commands. Examples of the hardware systems are magnetic media such as a hard disk, a floppy disk, a magnetic tape, optical media such as Compact Disc (CD)-Read Only Memory (ROM) and Digital Versatile Disc (DVD), Magneto-Optical Media, such as a floptical disk, ROM, Random Access Memory (RAM), flash memory, etc. The program commands include assembly language or machine code complied by a complier and a higher level language interpreted by an interpreter. The hardware systems may be implemented with at least one software module to comply with one or more aspects of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a memo function cooperating with an audio recording function on a mobile device, the method comprising:
    executing, using at least one computer processor of the mobile device, a memo function;
    executing, using the at least one computer processor of the mobile device, an audio recording function in response to a request of an audio recording while the memo function is executed;
    receiving a memo data via a touch screen of the mobile device and an audio data via a microphone of the mobile device simultaneously in real time;
    synchronizing the received memo data with the received audio data in response to the receiving of the memo data and the audio data, wherein the received memo data contains a plurality of objects, and each object of the plurality of objects is synchronized to an index point of the received audio data;
    storing, in a memory of the mobile device, a memo including the received memo data synchronized with the received audio data, wherein the storing of the memo including the received memo data synchronized with the received audio data comprises of creating at least one object from the received memo data according to a preset rule;
    creating of the at least one object from the received memo data according to a preset rule comprises of creating, based on a time point when the received memo data is first input and a position where the received memo data is first input, the at least one object in a certain period of time and within a certain length;
    outputting, using the touch screen of the mobile device, a screen corresponding to the stored memo in response to a request for executing the stored memo, wherein the outputted screen displays a progress bar for displaying a playback state of the received audio data in a first area of the outputted screen and displays the memo data in a second area of the outputted screen;
    playing back the received audio data from the stored memo including the received memo data synchronized with the received audio data in response to a received request on the outputted screen for playing back the received audio data, wherein the playing back of the received audio data comprises of varying a background color of the each object of the plurality of objects in the second area of the outputted screen according to the displayed playback state of the received audio data in the first area of the outputted screen;
    receiving a request for selecting an object of the plurality of objects of the received memo data while the received audio data is played back; and
    in response to the object selection, moving the displayed playback state of the received audio data to a second index point based on a ratio of a size from the start position of the object to a touch point on the object to an entire size of the object, the second index point identified independently of a content of the object.

2. The method of claim 1, wherein the playing back of the received audio data comprises:
    moving a slide bar of the progress bar to a position of the second index point synchronized to the selected object; and
    playing back the received audio data from the position of the second index point.

3. The method of claim 2, wherein the moving of the slide bar of the progress bar comprises:
    moving the slide bar of the progress bar based on a ratio of a length from a start position of the object to the touch point to an entire length of the object.

4. The method of claim 1, further comprising at least one of:
    arranging the plurality of objects according to a created order when an arrangement function is executed;
    editing the objects, wherein the editing includes deleting, modifying, adding, copying, and cutting and pasting function of objects; and or
    modifying a synchronization between the received audio data and the received memo data.

5. The method of claim 1, wherein the storing of the memo including the received memo data synchronized with the received audio data further comprises:
    synchronizing the created at least one object with a respective index point of the audio data.

6. The method of claim 5, wherein the preset rule comprises at least one of a time variable or a length variable.

7. The method of claim 5, wherein the preset rule is set with different variables according to modes for inputting the memo.

8. A system for operating a memo function cooperating with an audio recording function on a mobile device, the system comprising:
    a touch screen configured to:
    input a request for executing the memo function and the audio recording function,
    display a screen corresponding to the stored memo in response to a request for executing the stored memo, wherein the displayed screen displays a progress bar for displaying a playback state of the received audio data in a first area of the displayed screen and displays the received memo data in a second area of the displayed screen, and
    input a request for playing back the received audio data on the displayed screen;

an audio processor configured to receive audio signals and create the audio data;
at least one computer processor configured to:
control an execution of the memo function,
control an execution of an audio recording function in response to a request of an audio recording while the memo function is executed,
receive a memo data via the touch screen and an audio data via a microphone of the audio processor simultaneously in real time,
synchronize the received memo data with the received audio data in response to the receiving of the memo data and the audio data, wherein the received memo data contains a plurality of objects, and each object of the plurality of objects is synchronized to an index point of the received audio data,
create at least one object from the received memo data according to a preset rule comprises of create, based on a time point when the memo data is first input and a position where the memo data is first input, the at least one object in a certain period of time and within a certain length,
play back the received audio data from the stored memo including the received memo data synchronized with the received audio data in response to a received request on the displayed screen,
vary a background color of the each object of the plurality of objects in the second area of the displayed screen according to the displayed playback state of the received audio data in the first area of the displayed screen,
receive a request for selecting an object of the plurality of objects of the received memo data while the received audio data is played back, and
in response to the object selection, move the displayed playback of the received audio data to a second index point based on a ratio of a size from the start position of the object to a touch point on the object to an entire size of the object, the second index point identified independently of a content of the object; and a storage configured to store a memo including the received memo data synchronized with the received audio data.

9. The system of claim 8, wherein the at least one computer processor is further configured to:
move the slide bar of the progress bar to a position of the second index point synchronized to the selected object, and
play the received audio data from the position of the second index point.

10. The system of claim 9, wherein the at least one computer processor is further configured to move the slide bar of the progress bar based on a start time of the object.

11. The system of claim 9, wherein the at least one computer processor is further configured to move the slide bar of the progress bar based on a ratio of a length from a start position of the object to the touch point to an entire length of the object.

12. The system of claim 8, wherein the at least one computer processor is further configured to:
arrange the plurality of objects according to a created order when an arrangement function is executed,
control an editing function comprising a deletion of the object, a modification of the object, an addition of the object, a copy of the object, and a cut and paste of the object, and
control a function modifying a synchronization between the received audio data and the received memo data.

13. The system of claim 8, wherein the at least one computer processor is further configured to:
synchronize the created at least one object with a respective index point of the received audio data.

14. The system of claim 13, wherein the preset rule comprises at least one of a time variable or a length variable.

15. The system of claim 13, wherein the preset rule is set with different variables according to modes for inputting the memo.

* * * * *